United States Patent
Toya et al.

[11] Patent Number: 5,318,215
[45] Date of Patent: Jun. 7, 1994

[54] METHOD OF FORMING CLADDED CABLE HAVING FIBER WITH EXCESS LENGTH ENCLOSED THEREIN

[75] Inventors: Shigeo Toya; Tatsuo Teraoka; Yoshiyuki Hiramoto, all of Hitachi; Yasunori Yoshie, Yokohama, all of Japan

[73] Assignees: Hitachi Cable Ltd.; NKK Corporation, Tokyo, Japan

[21] Appl. No.: 21,334

[22] Filed: Feb. 23, 1993

[51] Int. Cl.[5] .............................................. H04B 9/00
[52] U.S. Cl. .................................... 228/148; 228/199
[58] Field of Search ................ 228/148, 155, 156, 199

[56] References Cited

U.S. PATENT DOCUMENTS

| | | | |
|---|---|---|---|
| 4,555,054 | 11/1985 | Winter et al. | 228/148 |
| 4,759,487 | 7/1988 | Karlinski | 228/148 |
| 4,852,790 | 8/1989 | Karlinski | 228/17.5 |
| 5,210,391 | 5/1993 | Yoshie et al. | 228/148 |

FOREIGN PATENT DOCUMENTS 58-186110  10/1983  Japan.
3-267905  11/1991  Japan.

*Primary Examiner*—Kenneth J. Ramsey
*Attorney, Agent, or Firm*—Frishauf, Holtz, Goodman & Woodward

[57] ABSTRACT

A method of manufacturing a metal pipe clad cable having a fiber with an excess length housed therein, comprises the steps of preparing a metal pipe clad cable comprising a metal pipe and a fiber housed in the metal pipe, and passing said metal pipe clad cable through a plurality of sets of bending rolls. The metal pipe is repeatedly bent when passing through the plural sets of said bending rolls so as to generate a plastic deformation within the metal pipe and, thus, to impart an excess length to the fiber within the metal pipe.

9 Claims, 2 Drawing Sheets

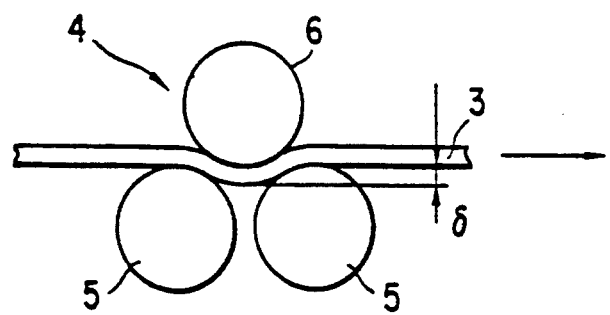
F I G. 3

METHOD OF FORMING CLADDED CABLE HAVING FIBER WITH EXCESS LENGTH ENCLOSED THEREIN

BACKGROUND OF THE INVENTION

1. Field of the Invention

The present invention relates to a method of manufacturing a metal pipe clad cable comprising a metal pipe and a fiber such as an optical fiber housed in the metal pipe, particularly to a method of imparting an excess length to the fiber housed in the metal pipe.

2. Description of the Related Art

An optical fiber is usually in the form of an optical fiber cable consisting of a protective pipe of a metal or non-metal and an optical fiber housed in the protective pipe. When it is used under several conditions as, for example, a marine cable for optical communication, it is required that the optical fiber be protected by a metal pipe having a high corrosion resistance, which is made of, for example, a stainless steel (Japanese Industrial Standards JIS SUS). It is also required that the protective metal pipe be light in weight and small in diameter. An optical fiber cable comprising a protective metal pipe is also adapted for a thermal sensor used in an environment of high temperatures.

FIG. 1 exemplifies an optical communication cable having the configuration described above, showing seven optical fibers housed in an SUS pipe in a bundled state.

If the optical fibers are held stretched within the pipe, fatigue fracture of fibers may occur in any application after a long period of time, which seriously impair the performance of the optical communication cable. It is known to the art that the fatigue fracture occurs in the case where the tensile strain of the optical fiber exceeds 0.2%. Therefore, it is necessary to design and manufacture an optical communication cable in order that the excess length of the optical fiber over the length of the metal pipe is not smaller than −0.2% when installed and also during use of the cable.

FIG. 2 shows a solution to the problem described above, where an optical fiber is loosely inserted into a metal pipe such that the optical fiber has a positive excess length over the metal pipe.

The required excess length naturally differs depending on the applications and environments. In the case of a marine cable previously referred to, the required excess length is substantially 0%. If the cable is used as a thermal sensor for high temperature measurement, however, the expansion of the metal pipe is relatively large composed to that of the optical fiber (substantially 0%). It means that, in some cases, the optical fiber is required to have an excess length of as much as 0.6% in the installation stage. In other words, it is required that the excess length of the optical fiber be accurately controlled as desired to fall within the range of 0% to 0.6% in the manufacturing process of the optical fiber cable.

The two methods given below are known to the art as techniques of manufacturing a metal pipe clad cable:

(1) A long metal pipe prepared in advance is wound around a shaft. While the long metal pipe is vibrated, an optical fiber is inserted into the pipe from one end of the pipe (Published Unexamined Japanese Patent Application No 58-186110).

(2) A long metal tape having a desired thickness and width, which is prepared in advance, is shaped and welded into a pipe. An optical fiber is inserted into the pipe in the welding step (U.S. Pat. No. 4,852,790).

The length of metal pipe clad cable manufactured by method (1) is at most about 2,000 m. On the other hand, method (2) permits the length about 10 times as long as that manufactured by method (1), i.e., about 20,000 m, through the length depending on the length of the metal tape prepared.

When it cause to the control of the excess length, Published Unexamined Japanese Patent Application No. 3-267905 is proposed for method (1), where an elastic strain is imparted in tension to the metal pipe in the step of inserting an optical fiber into a metal pipe in an amount corresponding to the required excess length of the optical fiber, and the tension is released after insertion of the optical fiber into the pipe (hereinafter referred to as method 1-a).

For method (2), the control of the excess length is disclosed in U.S. Pat. No. 4,759,487. It proposes that, in the step of winding up a metal pipe clad cable continuously manufactured, an inert gas is introduced into the manufactured pipe to make the optical fiber pushed, under the control of the pressure, toward the outer circumferential surface of the pipe. In this case, the optical fiber is deviated from the axis of the metal pipe, with the result that an excess length over the metal pipe is imparted to the optical fiber (hereinafter referred to as method 2-a).

The excess length aimed to impart and obtained by method 1-a is only +0.15% as described in Published Unexamined Japanese Patent Application No. 3-267905.

Meanwhile, as described in U.S. Pat. No. 4,759,487, the excess length can be imparted to the optical fiber by method 2-a is +0.2% at the maximum in the case of the particular product specifications and, in a special case, only −0.5%. Unless a desirable excess length is obtained regardless of the product specifications, the practical value of the method is low. In this sense, the scope of applications is limited in the case of method 2-a.

As described above, it is impossible to obtain an excess length of over +0.2% in either of method 1-a and method 2-a. Thus, a large excess length such as +0.6% cannot be imparted to the optical fiber in a metal pipe clad cable. It should also be noted that, in any of the conventional methods, an excess length is imparted in the manufacturing step of a metal pipe clad cable. It follows that, if it is found in the sampling inspection after manufacture of metal pipe clad cables that a desirable excess length is not imparted to the optical fiber, it is impossible to correct the excess length of the optical fiber, as desired. This means that it is unavoidable to discard the undesirable cables, leading to a marked reduction in the product yield. This problem is particularly serious in the case where the excess length control method includes such an unstable factor that the optical fiber is pushed, against the inner wall of the metal pipe, by controlling the gas pressure as in method 2-a. Neither of Published Unexamined Japanese Patent Application No. 3-267905 nor U.S. Pat. No. 4,759,487 does teach at all how to adjust the excess length of the optical fiber after manufacture of a metal pipe clad cable. In other words, how to solve the problem described above is unknown in this technical field in general.

SUMMARY OF THE INVENTION

An object of the present invention is to provide a method of manufacturing a metal pipe clad cable having a fiber with excess length housed therein, which permits overcoming the above-noted drawbacks inherent in the prior art by controlling accurately the excess length of an optical fiber included in the metal pipe clad cable in the desired range of up to 0.6%.

According to the present invention, there is provided a method of manufacturing a metal pipe clad cable having a fiber with an excess length housed therein, comprising the steps of preparing a metal pipe clad cable comprising a metal pipe and a fiber housed in the metal pipe; and passing said metal pipe clad cable through a plurality of sets of bending rolls; wherein the metal pipe is repeatedly bent when passing through the plural sets of said bending rolls so as to generate a plastic deformation within the metal pipe and, thus, to impart an excess length to the fiber within the metal pipe.

In the present invention, it is possible to give the additional excess length to the fiber after manufacture of the metal pipe clad cable having a fiber housed in the metal pipe so as to obtain a desired excess length. It is also possible to obtain a metal pipe clad cable having a fiber with a desired excess length in the manufacturing process of the metal pipe clad cable by incorporating the present method into a manufacturing line of a metal pipe clad cable having fiber housed in a metal pipe.

BRIEF DESCRIPTION OF THE DRAWINGS

FIG. 3 is a side view showing a set of rolls used in a bending apparatus used in the method of the present invention;

DETAILED DESCRIPTION OF THE PREFERRED EMBODIMENTS

For the purpose of promoting understanding of the present invention reference will be made to the embodiment in detail. The present invention provides a method of manufacturing a metal pipe clad cable having a fiber with an excess length housed in a metal pipe. In the method, a metal pipe clad cable having a fiber with an excess length housed in a metal pipe is passed through a plurality of sets of bending rolls so as to repeatedly impart a bending stress to the metal pipe and, thus, to impart a buckling shrinkage to the metal pipe. As a result, an excess length over the metal pipe is imparted to the fiber housed in the metal pipe.

It is desirable to arrange the plural sets of the bending rolls such that the axis of rotation of at least one set of the bending rolls is set perpendicular to the axis of rotation of the other sets of the bending rolls. Alternatively, it is desirable to rotate about the metal pipe at least one set of the bending rolls. Any of these measures makes it possible to improve the uniformity of the plastic deformation given to the metal pipe.

Figure 1:
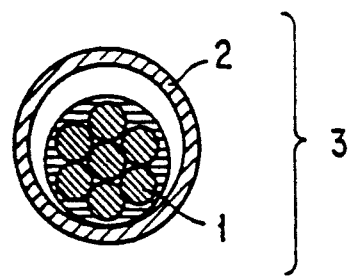
FIG. 1 is a cross sectional view exemplifying a fiber for optical communication.
Figure 2:
FIG. 2 is a vertical cross sectional view showing a concept of an optical fiber cable having an excess length.
Figure 4:
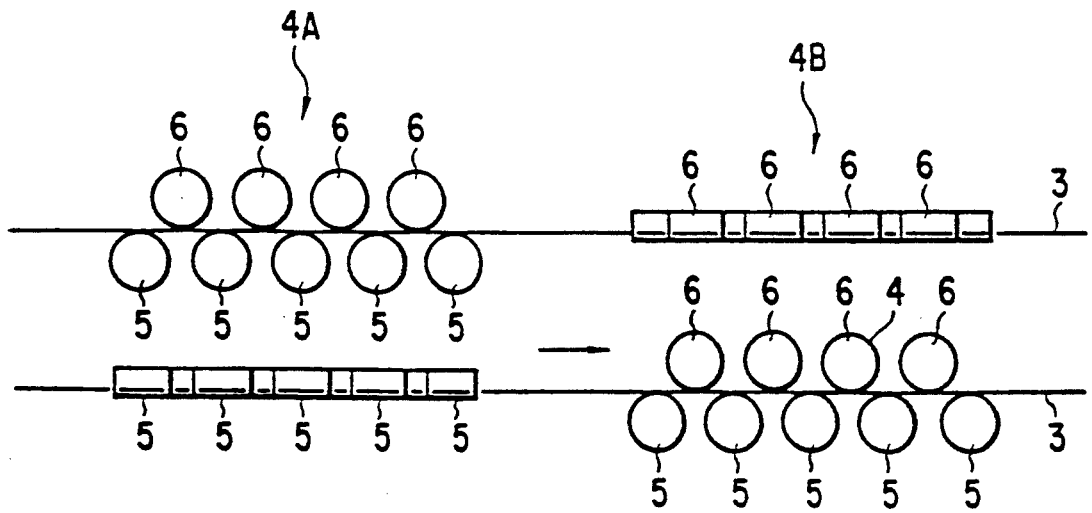
FIG. 4 is a side view exemplifying a bending apparatus.

FIG. 3 shows a configuration of a set of bending rolls and a metal pipe clad cable in a bending apparatus of the metal pipe clad cable. The bending apparatus comprises a basic set of three bending rolls which can be rotated freely around the roll axes. The set consist of two supporting rolls positioned below a metal pipe clad cable and a pressing roll positioned between the two supporting rolls and above the metal pipe clad cable. A plurality of sets of these bending rolls are arranged in the passing direction of the metal pipe clad cable as shown in FIG. 4. The arrangement shown in FIG. 4 covers the case where four sets of the bending rolls are positioned such that the axes of the adjacent bending rolls are perpendicular to each other.

The shrinkage of the metal pipe is explained as follows. When the metal pipe clad cable is bent, the outer region in the bent portion of the metal pipe receives a tensile load to be elongated. On the other hand, the inner region of the bent portion receives a compression load to be shrunk. In the case of such a wall thickness and diameter a in the metal pipe used for forming an optical fiber cable, the strain caused by the elongation of the outer region of the bent portion falls within a region of elastic deformation. However, the compression in the inner region of the bent portion is at most as much as about 9%, which is within a region of a plastic deformation. The hollow shape of the metal pipe brings about a permanent shrinkage due to a buckling phenomenon, the deformation which is left unremoved even after removal of the stress applied by the bending rolls. It should be noted that a surface roughening phenomenon appears after the treatment, as expected from the occurrence of permanent deformation, on the inner surface of the metal pipe, through a change in the outer diameter of the pipe cannot be recognized because of the small diameter of the metal pipe. However, this surface roughening is almost the same as that which takes place in the step of reducing the diameter of the metal pipe, said step being included in the manufacturing process of an ordinary optical fiber cable. Therefore, the surface roughening does not give rise to any problem in the metal pipe clad cable.

EXAMPLES

Example 1

Figure 5:
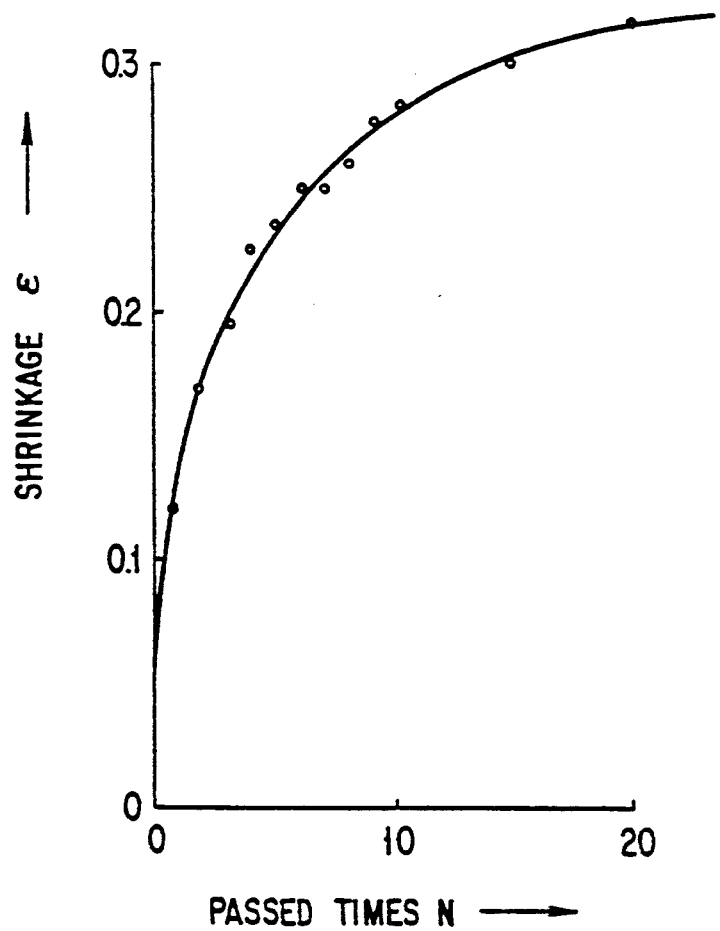
FIG. 5 is a graph showing the result of a bending test.

A metal pipe clad cable comprising a metal pipe having an outer diameter of 1.8 mm and a wall thickness of 0.2 mm and an optical fiber housed therein with no excess length ($\pm 0$) was passed through a bending apparatus constructed as shown in FIG. 4 so as to impart an excess length to the optical fiber over the metal pipe. Each of the bending rolls included in the bending apparatus was 50 mm in diameter. The pitch between the adjacent rolls, i.e., the pitch between a supporting roll and an adjacent pressing roll, was 75 mm. The amount of depression of the pressing roll was set at 1 mm. A metal pipe clad cable, which was 10 m long, was passed N times through the bending apparatus, followed by measuring a shrinkage in length $\epsilon$ of the metal pipe. FIG. 5 shows the results. The shrinkage $\epsilon$ is defined as follows:

$$\epsilon = (L - L')/L \times 100 (\%)$$

where, L is the initial length of the metal pipe, which was 10 m, and L' is the length of the metal pipe after the metal pipe was passed N times through the bending apparatus.

FIG. 5 shows that the shrinkage of the metal pipe is increased with the increase in the number N of passings of the pipe through the bending apparatus. It is also shown that the shrinkage reaches a substantially equilibrium state, when the number N is 10 or more. In this example, the maximum shrinkage was about 0.3%. A large shrinkage of the metal pipe indicates that the excess length of the optical fiber is positively increased. It follows that the excess length of the optical fiber can be controlled as desired within the range of up to 0.3% by controlling the number N of passings of the metal pipe through the bending apparatus under the conditions described above.

Another experiment was conducted under the same conditions, except that the pitch between the supporting roll and the pressing roll was set at 50 mm. The optical fiber was given an imparted excess length of +0.6% over the metal pipe, said excess length meeting the requirement for the use such as a thermal sensor.

EXAMPLE 2

Based on the results of Example 1, a bending apparatus was prepared by joining two bending apparatuses each constructed as shown in FIG. 4. The bending apparatus thus prepared was mounted to a machine corresponding to conventional method (2) described previously so as to manufacture a metal pipe clad cable of 1000 m length. Ten samples each having a length of 10 m were taken arbitrarily from the metal pipe clad cable thus manufactured to measure the excess length of the optical fiber over the metal pipe. The excess lengths for these samples were found to fall within the range of $0.20 \pm 0.03\%$. In other words, a variation in the excess length of the various portions of the optical fiber was found to be very small.

What is claimed is:

1. A method of manufacturing a metal pipe clad cable having a fiber with an excess length housed therein, comprising the steps of:
    preparing a metal pipe clad cable comprising a metal pipe and a fiber housed in the metal pipe; and
    passing said metal pipe clad cable through a plurality of sets of bending rolls;
    wherein the metal pipe is repeatedly bent when passing through the plural sets of said bending rolls so as to generate a plastic deformation within the metal pipe and, thus, to impart an excess length to the fiber within the metal pipe.

2. The method of manufacturing a metal pipe clad cable according to claim 1, wherein the axis of rotation of at least one set of rolls included in said plural sets of bending rolls is arranged perpendicular to the axis of rotation of other sets of rolls.

3. The method of manufacturing a metal pipe clad cable according to claim 1, wherein at least one set of rolls included in said plural sets of bending rolls are rotated about the metal pipe clad cable.

4. The method of manufacturing a metal pipe clad cable according to claim 1, wherein said metal pipe clad cable is an optical fiber cable.

5. A method of manufacturing a metal pipe clad cable having a fiber with an excess length housed therein, comprising the steps of:
    continuously preparing a metal pipe from a metal strip;
    inserting a fiber into said metal pipe to prepare a metal pipe clad cable; and
    passing said metal pipe clad cable having said fiber inserted into said metal pipe through a plurality of sets of bending rolls;
    wherein the metal pipe is repeatedly bent when passing through the plural sets of said bending rolls so as to generate a plastic deformation within the metal pipe and, thus, to impart an excess length to the fiber within the metal pipe.

6. The method of manufacturing a metal pipe clad cable according to claim 5, wherein the axis of rotation of at least one set of rolls included in said plural sets of bending rolls is arranged perpendicular to the axis of rotation of other sets of rolls.

7. The method of manufacturing a metal pipe clad cable according to claim 5, wherein at least one set of rolls included in said plural sets of bending rolls are rotated about the metal pipe clad cable.

8. The method of manufacturing a metal pipe clad cable according to claim 5, wherein said metal pipe clad cable is an optical fiber cable.

9. The method of manufacturing a metal pipe clad cable according to claim 5, wherein the step of preparing said metal pipe is carried out simultaneously with the step of inserting the fiber into said metal pipe.

* * * * *